United States Patent
Kemkemian et al.

(10) Patent No.: US 8,482,455 B2
(45) Date of Patent: Jul. 9, 2013

(54) RADAR WITH HIGH ANGULAR ACCURACY, NOTABLY FOR THE OBSTACLE SENSING AND AVOIDANCE FUNCTION

(75) Inventors: Stéphane Kemkemian, Paris (FR); Pascal Cornic, Guilers (FR); Patrick Le Bihan, Lannilis (FR)

(73) Assignee: Thales, Neuilly sur Siene (FR)

( * ) Notice: Subject to any disclaimer, the term of this patent is extended or adjusted under 35 U.S.C. 154(b) by 328 days.

(21) Appl. No.: 12/902,002

(22) Filed: Oct. 11, 2010

(65) Prior Publication Data
US 2011/0248881 A1 Oct. 13, 2011

(30) Foreign Application Priority Data
Oct. 12, 2009 (FR) ..................................... 09 04880

(51) Int. Cl.
*G01S 13/42* (2006.01)
(52) U.S. Cl.
USPC ........... 342/107; 342/109; 342/133; 342/139; 342/146; 342/147
(58) Field of Classification Search
USPC ......... 342/107, 109, 112, 113, 115, 127–135, 342/139, 146–147
See application file for complete search history.

(56) References Cited

U.S. PATENT DOCUMENTS

| | | | |
|---|---|---|---|
| 4,630,051 A * | 12/1986 | Adams et al. | 342/133 |
| 5,404,144 A * | 4/1995 | Vlannes | 342/13 |
| 5,559,516 A * | 9/1996 | Didomizio et al. | 342/118 |
| 5,818,383 A * | 10/1998 | Stockburger et al. | 342/109 |
| 6,639,545 B1 * | 10/2003 | Hager et al. | 342/107 |
| 7,764,217 B2 * | 7/2010 | Yannone | 342/13 |
| 2003/0210178 A1 * | 11/2003 | Hager et al. | 342/159 |
| 2005/0156780 A1 * | 7/2005 | Bonthron et al. | 342/107 |
| 2008/0174474 A1 * | 7/2008 | Harris et al. | 342/107 |
| 2009/0207071 A1 | 8/2009 | Kinoshita et al. | |

OTHER PUBLICATIONS

Francois Le Chevalier, et al., "Coloured Transmission for Radar Active Antenna", Revue General de L'Electricite et de L'Electronique, Revue Generale de L'Electricite, S.A., Mar. 1, 2005, pp. 48-52, No. 6, XP001536744.
Francois Le Chevalier et al., "Space-Time Transmission and Coding for Airborne Radars, Radar Science and Technology", Dec. 1, 2008, pp. 411-421, vol. 6, No. 6, XP009130674.
S. Ohshima, et al., "Phase-Comparison Monopulse Radar with Switched Transmit Beams for Automotive Application", Microwave Symposium Digest—1999 IEEE MIT-S International, Jun. 13, 1999, pp. 1493-1496, vol. 4, IEEE, Piscataway, NJ, USA, XP010343561.
Jameson Bergin, et al., "MIMO Phase-Array for SMTI Radar", Aerospace Conference, Mar. 1, 2008, pp. 1-7, IEEE, Piscataway, NJ, USA, XP031256286.
Francois Le Chevalier, et al., "Emission coloree pur antenne active radar," Les Radars, Mar. 2005, pp. 48-52.

* cited by examiner

*Primary Examiner* — John B Sotomayor
(74) *Attorney, Agent, or Firm* — Baker & Hostetler, LLP

(57) ABSTRACT

The present invention relates to a radar device with high angular accuracy. The solution provided by the invention simultaneously combines an interferometer that is accurate but, for example, ambiguous when receiving; and a space coloring mode when transmitting. The coloring of the space consists notably in transmitting on N transmitting antennas N orthogonal signals. These signals are then separated by filtering on reception using the orthogonality properties of the transmission signals. It is, for example, possible, with two contiguous antennas in transmission associated with two orthogonal codes to produce a single-pulse type system when transmitting. The invention applies notably to the obstacle sensing and avoidance function, also called "Sense & Avoid".

5 Claims, 1 Drawing Sheet

RADAR WITH HIGH ANGULAR ACCURACY, NOTABLY FOR THE OBSTACLE SENSING AND AVOIDANCE FUNCTION

CROSS-REFERENCE TO RELATED APPLICATION

This application claims priority to foreign French patent application No. FR 0904880, filed on Oct. 12, 2009, the disclosure of which is incorporated by reference in its entirety.

FIELD OF THE INVENTION

The present invention relates to a radar device with high angular accuracy. It applies notably to the obstacle sensing and avoidance function, also called "Sense & Avoid".

BACKGROUND OF THE INVENTION

Producing a radar function for sensing airborne obstacles that are not cooperative for aircraft, in particular for drones, is essential to enable autopiloted aircraft to be included in the non-segregated air domain. It participates in the obstacle sensing and avoidance function called "Sense and Avoid".

The field of application of the invention is notably that of short- and medium-range radars, which do not require a large antenna surface area, but do require a very good angular accuracy. Such is the case in particular with radars intended for the "Sense & Avoid" function.

The range of a radar is proportional, notably, to the surface area of its receiving antenna. This applies regardless of how the space is operated, this mode of operation of the space possibly being based on mechanical scanning, sequential electronic scanning or even beam forming by the FFC calculation, provided, however, that it is possible to swap spatial gain in transmission for coherent gain according to time in reception.

Moreover, the angular accuracy of a radar is proportional, in a first approach to the ratio λ/H in which λ is the wavelength and H is the length of the antenna in the plane in which the angular measurement is to be made. High accuracy may require a great length H. However, there is a problem notably due to the fact that this length may prove pointless from the range point of view if the antenna is not a lacuna antenna.

The above reasoning applied for one dimension is easily extended to two dimensions, on two axes, for example the azimuth and the elevation.

Currently, this problem is notably resolved by a very accurate angular measurement, but one which is very greatly ambiguous, obtained with an interferometer in reception, comprising two antennas, for which the distance between phase centres is significant.

To eliminate the ambiguities, one known technique entails using an interferometer with a number of antennas whose phase centres are irregularly spaced. In this case, at least three antennas are necessary.

However, this quickly leads to an implementation that is complex and of large size if the elimination of the angular ambiguities is to be reliable.

SUMMARY OF THE INVENTION

The invention notably overcomes the abovementioned drawbacks. To this end, the subject of the invention is a radar device comprising at least:

in transmission (21), a coloured transmission system comprising at least two contiguous antennas (1, 2, 3, 4, 5, 6), the first antenna transmitting a first code (E1) and the second antenna transmitting a second code (E2), the two codes being mutually orthogonal;

filtering means (40) separating the received signals into two signals R1 and R2, the signal R1 corresponding to the first code (E1) and the signal R2 corresponding to the second code (E2), a first measurement of the angle of arrival of the target echo being obtained by applying the single-pulse measurement principle to the two signals R1 and R2, said second measurement having a measurement accuracy and an ambiguity level;

in reception (22), an interferometer comprising at least two receiving antennas (71, 72), supplying a phase measurement and therefore a second measurement of the angle of arrival of a target echo, said first measurement having a direction accuracy and an ambiguity level;

the measurement retained for an angle of arrival of a target echo having the direction accuracy of the second measurement and the angular ambiguity level of the first measurement.

In a particular embodiment, the receiving antennas are, for example, spaced apart and the transmitting antenna is divided into two antennas, each being fed by a code, the codes being mutually orthogonal.

Thus, the solution provided by the invention simultaneously combines:

an interferometer that is accurate but, for example, ambiguous when receiving;

a space colouring mode when transmitting.

The colouring of the space consists notably in transmitting on N transmitting antennas N orthogonal signals. These signals are then separated by filtering on reception using the orthogonality properties of the transmission signals.

It is, for example, possible, with two contiguous antennas in transmission associated with two orthogonal codes to produce a single-pulse type system when transmitting.

BRIEF DESCRIPTION OF THE DRAWINGS

Other features and advantages of the invention will become apparent from the following description, given in light of the appended drawings which represent.

DETAILED DESCRIPTION

Figure 1:
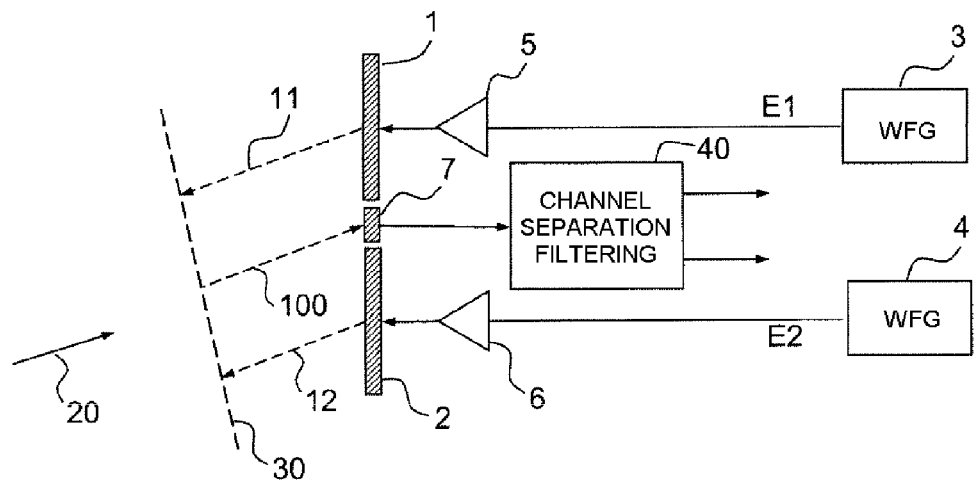
FIG. 1, an illustration of the operating principle of a radar according to the invention.

FIG. 1 illustrates the operating principle of a radar according to the invention, in transmission and in reception, by an exemplary implementation.

The invention notably combines:

an interferometer that is accurate but ambiguous when receiving, the receiving antenna of this interferometer forming the receiving antenna of the radar;

a space colouring mode when transmitting.

The colouring of the space entails transmitting on N transmitting antennas N orthogonal signals. These signals are then separated by filtering 40 on reception based on their orthogonality properties.

FIG. 1 illustrates an exemplary embodiment in which N=2. The transmission system comprises two contiguous transmitting antennas 1, 2 each associated with a code, both of these antennas forming a transmitting antenna. The first antenna 1 is thus associated with a first code E1 and the second antenna is thus associated with a second code E2, the two codes being mutually orthogonal. It is then possible to produce a single-pulse system when transmitting.

A first waveform generator 3 supplies a transmission signal transmitted according to the code E1, this signal is then amplified by a power amplifier 5 before being delivered to the first antenna 1. A second waveform generator 4 supplies a transmission signal transmitted according to the code E2, this signal is then amplified by a power amplifier 6 before being delivered to the second antenna 2. The coding functions are, for example, integrated in the waveform generators 3, 4.

The transmission signals 11, 12 are transmitted by each half 1, 2 of the transmission antenna. FIG. 1 illustrates the progression of a wave transmitted in a given direction 20 according to the progression of the phase plane 30.

A reception signal 100 is, for example, received in this direction 20. This signal is received by a receiving antenna 7.

Figure 2:
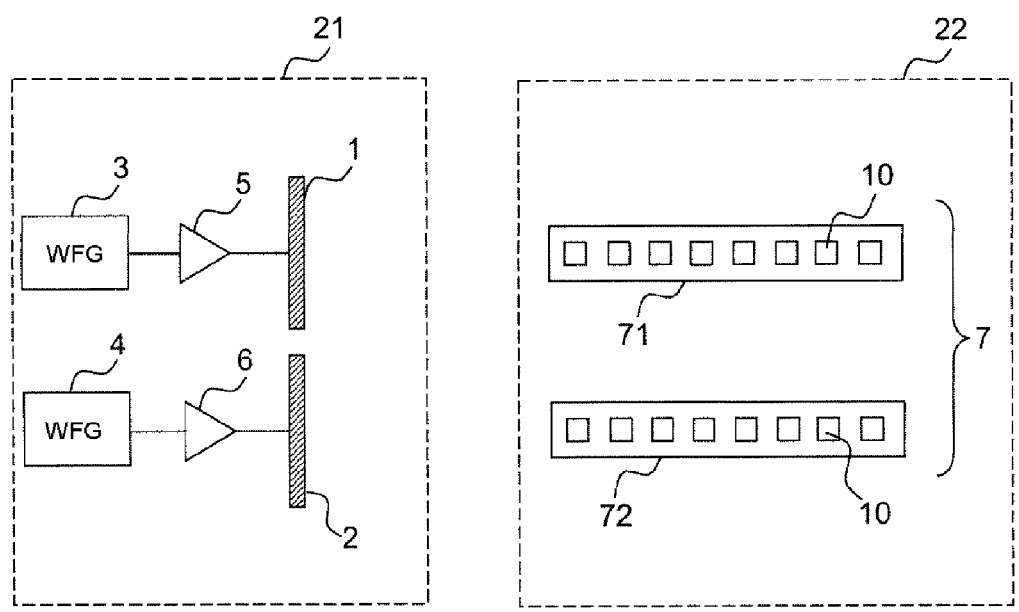
FIG. 2, by a block diagram, an exemplary embodiment of a radar transmission and reception system according to the invention.

FIG. 2 is a block diagram showing the transmission part 21 and the reception part 22 of the transmission and reception system of a radar according to the invention. The transmission part comprises the waveform generators 3, 4 and the amplifiers 5, 6 associated with each antenna 1, 2 as described in relation to FIG. 1. The reception part comprises two linear arrays 71, 72 of radiant elements 10 forming the receiving antenna 7. The set of subarrays 71, 72 is linked to the reception channels which are not represented, the implementation of which is known from elsewhere through the use of filtering means.

The two subarrays 71, 72 are therefore linked at the output to the filtering means 40. More particularly, the filtering means consist of two filtering channels, a first channel being assigned to the first antenna 71 and the second channel being assigned to the second antenna 72.

The filtering means 40 separate the reception signals by using the orthogonality properties of the transmission signals E1, E2. This orthogonality property makes it possible to discriminate the portion of a reception signal R1 associated with the transmission signal E1 and the reception part R2 associated with the transmission signal E2. At the output of the filtering means, the reception signal R1 is delivered to a first reception channel, hereinafter called R1, and the reception signal R2 is delivered to a second reception channel, hereinafter called R2.

The reception signals received from the receiving antenna 7 can be digitized before or after the filtering means 40 depending on how the latter are implemented. If they are implemented in digital technology, the analogue-digital converters are located before the filtering means.

By virtue of the transmission of two orthogonal codes E1 and E2 on the two halves 1, 2 of the transmitting antenna, the signals received from a target in a given direction 10, after separation of the channels R1 and R2, are equivalent to those that would have been received, from the same target, by the same antenna 1, 2, but operating in reception mode. The signal R1 corresponds to the transmission signal E1 and the signal R2 corresponds to the transmission signal E2. A single-pulse phase system in transmission has therefore been produced, by virtue of the separate transmissions of two orthogonal codes. In other words, two antennas are used in transmission transmitting the signals E1 and E2 in order to make an angular measurement that can be done with a single antenna in reception, this measurement being performed by applying the single-pulse measurement principle to the signals R1 and R2.

Advantageously this single-pulse system in transmission is of small size. In practice, the transmitting antenna consisting of the two antennas 1, 2 may be of very small size. This single-pulse system in transmission has little direction accuracy. On the other hand, it has little or even no direction ambiguity.

In other words, the space colouring system in transmission associated with an antenna device in transmission, notably of small size, makes it possible to measure, after reception and filtering on each of the receiving antennas 71, 72, an inaccurate but unambiguous arrival direction. A first measurement of the angle of arrival is thus obtained with a given direction accuracy and a given ambiguity level.

The two receiving antennas 71, 72 supply a phase measurement, therefore an angle of arrival θ of a target echo, which is very accurate but potentially ambiguous.

The interferometry that is ambiguous in reception makes it possible to accurately measure, to within one ambiguity rank k, the direction of arrival of the target signal in the direction cosine mode. In particular, the measurement $\theta_{MEASUREMENT}$ of the angle of arrival is given by the following relation:

$$\theta_{MEASUREMENT} = \theta_{REAL} + S_{NOISE} + k \cdot \Delta\theta \quad (1)$$

$\theta_{REAL}$ being the real angle of arrival of the target on the receiving antenna, $S_{NOISE}$ being the noise signal and $\Delta\theta$ being the angular width corresponding to an ambiguity. This angular width is a function of the distance between the phase centres of the interferometer. It is perfectly known.

A second measurement of the angle of arrival is thus obtained with a given direction accuracy and a given ambiguity level.

The measurement of the angle of arrival of a target echo that is retained retains the accuracy of this second measurement and the ambiguity level of the first measurement. There is thus obtained a measurement that is accurate in direction with low ambiguity, or even zero ambiguity.

The above implementation principle is described in one plane, but it can obviously be generalized to two planes in space, for example in the elevation plane and in the azimuth plane.

Similarly, it is possible to use a colouring configuration in transmission which provides an ambiguous measurement, this possibly being, for example, the consequence of transmission antenna layout constraints. In this case, the measurement $\theta'_{MEASUREMENT}$ obtained by virtue of the transmission, is for example of the type:

$$\theta'_{MEASUREMENT} = \theta_{REAL} + S'_{NOISE} + k' \cdot \Delta\theta' \quad (2)$$

$S'_{NOISE}$ being the noise signal and $\Delta\theta'$ being the angular width corresponding to an ambiguity.

For it to be possible to eliminate the ambiguity, the transmission parameters are parameters such that the ratio $$\frac{\Delta\theta'}{\Delta\theta}$$

is close to a ratio $$\frac{q'}{q}$$

in which q and q' are prime numbers.

The invention claimed is:

1. A radar device comprising:
   in transmission, a coloured transmission system comprising at least two contiguous antennas, the first antenna transmitting a first code and the second antenna transmitting a second code, the two codes being mutually orthogonal;
   filtering means separating the received signals into two signals R1 and R2, the signal R1 corresponding to the first code and the signal R2 corresponding to the second code, a first measurement of the angle of arrival of the target echo being obtained by applying the single-pulse measurement principle to the two signals R1 and R2, said second measurement having a measurement accuracy and an ambiguity level;
   in reception, an interferometer comprising at least two receiving antennas, supplying a phase measurement and therefore a second measurement of the angle of arrival of a target echo, said first measurement having a direction accuracy and an ambiguity level;
   the measurement retained for an angle of arrival of a target echo having the direction accuracy of the second measurement and the angular ambiguity level of the first measurement.

2. The radar device according to claim 1, wherein the receiving antennas are spaced apart and the transmitting antenna is divided into two antennas, each being configured to be fed by a code, the codes being mutually orthogonal.

3. The radar device according to claim 1, wherein the coloured transmission system is further configured to deliver an ambiguous measurement, its ambiguity pitch $\Delta\theta'$ with regard to an ambiguity pitch of the interferometer $\Delta\theta$ is chosen so that the combination of the first measurement and the second measurement eliminates the ambiguity ranks from the measurements.

4. The radar device according to claim 3 further configured such that the ratio of the ambiguity pitches $$\frac{\Delta\theta'}{\Delta\theta}$$

is chosen to be close to a ratio $$\frac{q'}{q}$$

in which q and q' are prime numbers.

5. The radar device according to claim 1 further configured such that the measurements are made in the elevation plane and in the azimuth plane.

* * * * *